United States Patent
Schultz et al.

(10) Patent No.: US 7,252,225 B2
(45) Date of Patent: Aug. 7, 2007

(54) STORED-VALUE CARD ADAPTED TO BE READ BY AN ELECTRONIC DEVICE

(75) Inventors: Mark A. Schultz, Burnsville, MN (US); Stacey Donovan, Prairie Village, KS (US)

(73) Assignee: Target Brands, Inc., Minneapolis, MN (US)

( * ) Notice: Subject to any disclaimer, the term of this patent is extended or adjusted under 35 U.S.C. 154(b) by 0 days.

(21) Appl. No.: 11/336,448

(22) Filed: Jan. 20, 2006

(65) Prior Publication Data

US 2006/0118618 A1 Jun. 8, 2006

Related U.S. Application Data

(63) Continuation of application No. 11/006,504, filed on Dec. 6, 2004, now Pat. No. 7,055,740.

(51) Int. Cl.
*G06K 5/00* (2006.01)

(52) U.S. Cl. ...................................... 235/380

(58) Field of Classification Search ................ 235/380
See application file for complete search history.

(56) References Cited

U.S. PATENT DOCUMENTS

| | | | |
|---|---|---|---|
| D305,887 S | 2/1990 | Nishimura | |
| 5,982,736 A | 11/1999 | Pierson | |
| 6,016,298 A | 1/2000 | Fischer | |
| D429,733 S | 8/2000 | Jones et al. | |
| D436,991 S | 1/2001 | Morgante | |
| 6,386,457 B1* | 5/2002 | Sorie | 235/487 |
| 6,400,675 B1 | 6/2002 | Everidge et al. | |
| 6,510,124 B1 | 1/2003 | Wood | |
| 6,561,420 B1 | 5/2003 | Tsai et al. | |
| 6,575,835 B1* | 6/2003 | Mishina et al. | 463/42 |
| 6,666,378 B2 | 12/2003 | Dávila et al. | |
| 6,684,197 B1* | 1/2004 | Kolls | 705/41 |
| 6,715,795 B2* | 4/2004 | Klure | 283/62 |

(Continued)

FOREIGN PATENT DOCUMENTS

GB 2 277 482 11/1994

OTHER PUBLICATIONS

"Best Buy CD Cardz", www.serious.com/projBestBuy, Nov. 9, 2004.

(Continued)

*Primary Examiner*—Michael G. Lee
*Assistant Examiner*—Tae W. Kim
(74) *Attorney, Agent, or Firm*—Ingrassia Fisher & Lorenz, P.C.

(57) ABSTRACT

A stored-value card including a first surface and a second surface. The first surface stores data adapted to be read by an electronic device to perform at least one interactive activity. The second surface is opposite the first surface. The second surface includes account indicia signifying a financial account linked to the stored-value card, and brand indicia relating to a retail setting configured to redeem the stored-value card. The at least one interactive activity includes displaying at least one of a character, an object, a textual passage, and a symbol associated with the retail setting. Financial transaction card assemblies, packaged stored-value cards, and methods of using such cards are also disclosed.

32 Claims, 12 Drawing Sheets

U.S. PATENT DOCUMENTS

| | | |
|---|---|---|
| 6,749,114 B2 | 6/2004 | Madani |
| 6,910,627 B1* | 6/2005 | Simpson-Young et al. .. 235/381 |
| 2002/0017759 A1 | 2/2002 | McClung, III et al. |
| 2002/0066789 A1* | 6/2002 | Yen ............................ 235/487 |
| 2003/0004889 A1 | 1/2003 | Fiala et al. |
| 2003/0022586 A1 | 1/2003 | Beged-Dov |
| 2003/0132300 A1* | 7/2003 | Dilday et al. ............... 235/487 |
| 2003/0155425 A1 | 8/2003 | Lynch |
| 2004/0046035 A1 | 3/2004 | Davila et al. |
| 2004/0064364 A1* | 4/2004 | Toyooka ...................... 705/14 |
| 2004/0182940 A1* | 9/2004 | Biller ......................... 235/493 |
| 2005/0184164 A1* | 8/2005 | de Jong ...................... 235/492 |

OTHER PUBLICATIONS

EFT Direct, MonetaOne Multimedia Gift Card, http://web.archive.org/web/20020808051140/http://www.eft-direct.com/multimedia.html, pp. 1-4, Aug. 8, 2002.

Michigan Technology News, Xenaga Offers CD Gift Card; Could Close Deal with NASCAR, http://64.233.167.104/search?q=cache:axIL0PJ_16oJ:www.mitechnews.com/technews/entr . . . Mar. 12, 2003, pp. 1-4.

The X-card, http://www.xenga.com, pp. 1-9.

One28 Marketing Group, LLC Introduces First Multimedia Gift Card™ on the Market, http://www.one28marketing.com/pressrelease/june_15_2004.html, Jun. 15, 2004, pp. 1-3.

* cited by examiner

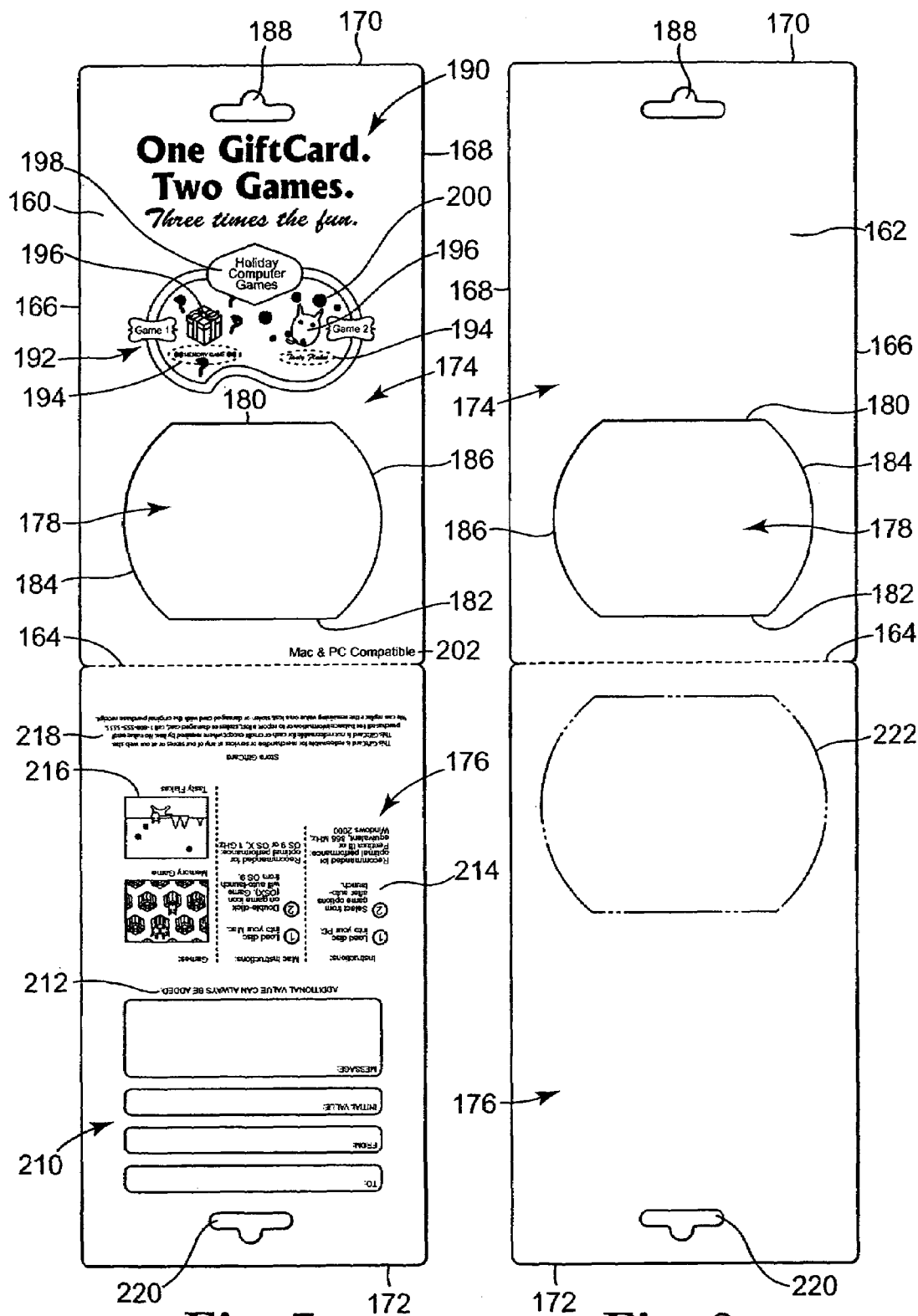

362 — Software License and Limited Warranty. This End-User License Agreement ("EULA") is a legal agreement for the software items that will start after you click I ACCEPT below (collectively the "Software Product"), and is between you and the Store ("Licensor"). By using the Software Product, you agree to read the entire EULA (scrolling to the bottom of the agreement) and agree to be bound by the terms of this EULA. You must indicate your agreement to be bound by the terms of this EULA by pressing the "I ACCEPT" button below, or else you will not be able to run the Software Product.

368 — COPYRIGHT. The Software Product is protected by copyright laws and international copyright treaties, as well as other intellectual property laws and treaties. All title and copyrights in and to the Software Product (including but not limited to any images, photographs, animations, video, audio, music, text, and "applets" incorporated into the Software Product) are owned by Licensor or its suppliers.

370 — GRANT OF LICENSE. The Software Product is licensed, not sold. This EULA is not transferable. Subject to the condition that you are in compliance with the terms of this EULA, you may use this one copy of the Software Product on a single computer for use by a single simultaneous operator. No other use, copying or distribution of the Software Product is permitted. You may not rent the Software Product, nor may you offer use of it to others through a service bureau or application service provider. The license term extends perpetually unless terminated by the terms below.

372

374 — LIMITATIONS. Except to the extent such a restriction is unenforceable under local law, you may not reverse engineer, decompile, or disassemble the Software Product. The Software Product is licensed as a single product, and its component parts may not be separated for use on more than one computer. You may not modify, amend, or create derivative works of the Software Product.

376 — TERMINATION. Without prejudice to any other rights, Licensor may terminate this EULA at any time if you fail to comply with the terms and conditions of this EULA. The terms of this paragraph shall survive any termination of this EULA.

378 — NO WARRANTY. TO THE MAXIMUM EXTENT PERMITTED BY APPLICABLE LAW, LICENSOR AND ITS SUPPLIERS DISCLAIM ALL WARRANTIES AND CONDITIONS WITH REGARD TO OR ARISING OUT OF THE SOFTWARE PRODUCT, EITHER EXPRESS OR IMPLIED, INCLUDING, BUT NOT LIMITED TO, IMPLIED WARRANTIES OF MERCHANTABILITY, FITNESS FOR A PARTICULAR PURPOSE, NON-INFRINGEMENT AND/OR ACCURACY OF INFORMATION.

380 — LIMITATION OF LIABILITY. TO THE MAXIMUM EXTENT PERMITTED BY APPLICABLE LAW, IN NO EVENT SHALL LICENSOR OR ITS SUPPLIERS BE LIABLE FOR ANY SPECIAL, INCIDENTAL, INDIRECT, OR CONSEQUENTIAL DAMAGES WHATSOEVER (INCLUDING, WITHOUT LIMITATION, DAMAGES FOR LOSS OF BUSINESS PROFITS, BUSINESS INTERRUPTION, LOSS OF BUSINESS INFORMATION, OR ANY OTHER PECUNIARY LOSS) ARISING OUT OF THE USE OF OR INABILITY TO USE THE SOFTWARE PRODUCT, EVEN IF LICENSOR HAS BEEN ADVISED OF THE POSSIBILITY OF SUCH DAMAGES. IN ANY CASE, LICENSOR'S ENTIRE LIABILITY UNDER ANY PROVISION OF THIS EULA SHALL BE LIMITED TO NO MORE THAN $5.00(US). Some states do not allow the exclusion or limitation of incidental or consequential damages, so the above limitation or exclusion may not apply to you.

382 — GENERAL. This EULA constitutes the entire agreement between you and Licensor concerning the Software Product. No terms of any purchase order, acceptance, purported amendment, or any document or communication other than an agreement expressly agreed upon in writing by a duly authorized officer of Licensor shall replace, modify, amend or override this EULA. If any provision of this EULA is held to be unenforceable for any reason, such provision shall be reformed only to the extent necessary to make it enforceable, and such decision shall not affect the enforceability of such provision under other circumstances, or of the remaining provisions hereof under all circumstances. No waiver by Licensor of any breach of any term or provision of this EULA shall be construed to be a waiver of any preceding or succeeding breach of the same or any other term or provision hereof. The parties' various rights and remedies hereunder shall be construed to be cumulative and no one of them is exclusive of any other or of any right or remedy allowed by law or in equity. This EULA shall be governed by and construed in accordance with the laws of the State of Minnesota, USA (without regard to its choice of law principles), except to the extent the local law of your local jurisdiction requires use of your local jurisdiction's law, and shall benefit Licensor, its successors and assigns. Should you have any questions concerning this EULA, or if you desire to contact Licensor for any reason, please call the Store GiftCard Line at 1-800-555-5555.

[ I ACCEPT ] (364)    [ I DECLINE ] (366)

Fig. 13

STORED-VALUE CARD ADAPTED TO BE READ BY AN ELECTRONIC DEVICE

CROSS-REFERENCE TO RELATED APPLICATION

This application is a continuation of U.S. patent application Ser. No. 11/006,504, filed Dec. 6, 2004 now U.S. Pat. No. 7,055,740 and which is incorporated herein by reference.

BACKGROUND OF THE INVENTION

Stored-value cards and other financial transactions cards come in many forms. A gift card, for example, is a type of stored-value card that includes pre-loaded or selectively loaded monetary value. In one example, a customer buys a gift card having a specified value for presentation as a gift to another person. In another example, a customer is offered a gift card as an incentive to make a purchase. A gift card, like other stored-value cards, can be "recharged" or "reloaded" at the direction of the bearer. The balance associated with the card declines as the card is used, encouraging repeat visits to the retailer or other provider issuing the card. Additionally, the card generally remains in the user's purse or wallet, serving as advertisement or reminder to revisit the associated retailer. Gift cards provide a number of advantages to both the consumer and the retailer.

SUMMARY OF THE INVENTION

One aspect of the present invention relates to a stored-value card including a first surface and a second surface. The first surface stores data adapted to be read by an electronic device to perform at least one interactive activity. The second surface is opposite the first surface. The second surface includes account indicia signifying a financial account linked to the stored-value card and brand indicia relating to a retail setting configured to redeem the stored-value card. The at least one interactive activity includes displaying at least one of a character, an object, a textual passage, and a symbol associated with the retail setting. Related products and methods are also disclosed and provide additional advantages.

BRIEF DESCRIPTION OF THE DRAWINGS

Embodiments of the invention will be described with respect to the figures, in which like reference numerals denote like elements, and in which:

FIG. 7 is a front view of one embodiment of an outside of a package backer for a stored-value card, according to the present invention.

FIG. 8 is a back view of the package backer of FIG. 7.

FIG. 13 is an illustration of one embodiment of an End-User License Agreement user interface, according to the present invention.

DETAILED DESCRIPTION

A gift card or other stored-value card is adapted for making purchases of goods and/or services from e.g. a retail store or website. A stored-value card, according to embodiments of the present invention, stores data adapted to be read by an electronic device, such as an optical data reader, to present a user with interactive activities via a computer processing unit equipped with or operably coupled to the electronic device. In one embodiment, the interactive activities specifically include indications, objects, activities, slogans, advertising, promotional information, brand indicia, logos, and/or other information linked to a brand identifier of a particular store, product, or service for which the stored-value card can be used and applied to purchase goods and/or services.

According to one embodiment, an original consumer buys the stored-value card to give a recipient who in turn is able to use the stored-value card at a retail store or setting to pay for goods and/or services. The stored-value card presents one or more interactive activities and/or static data sets related to the products and/or retail setting with which the stored-value card is associated. In this manner, the original consumer provides the recipient with entertainment or education in addition to the ability to pay for goods and/or services. In some embodiments, the interactive activities on the stored-value card are related to an occasion, such as a wedding, new baby, graduation, holiday, season, etc. For example, in the case of a wedding, the bride and groom receive a stored-value card including interactive activities or static data relating to a wedding and use the gift card to shop for home needs or other items.

Figure 1:
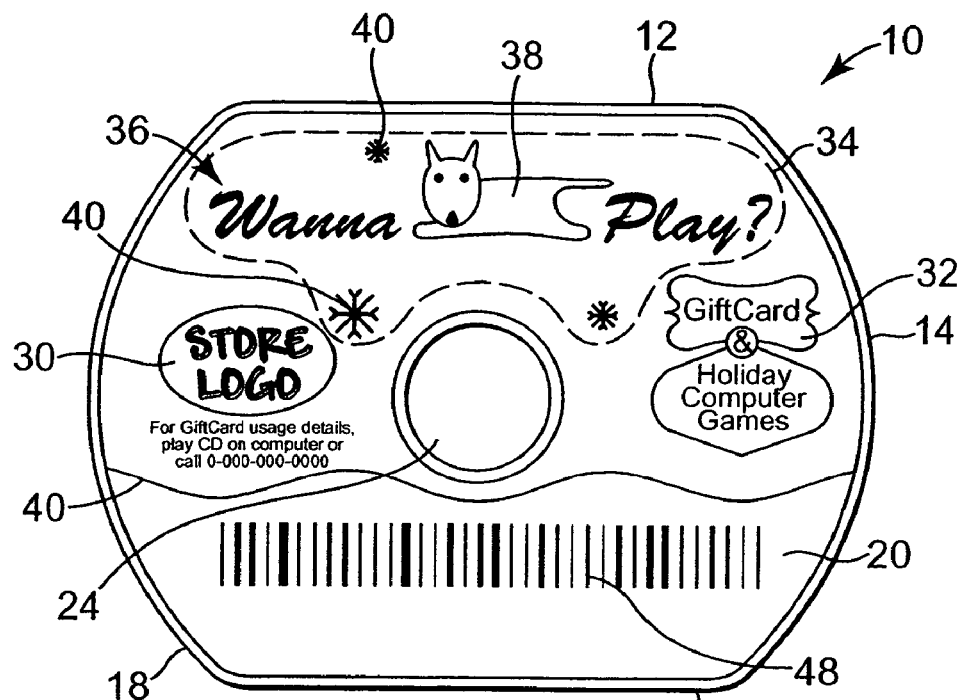
FIG. 1 is a front view of one embodiment of a stored-value card, according to the present invention.
Figure 2:
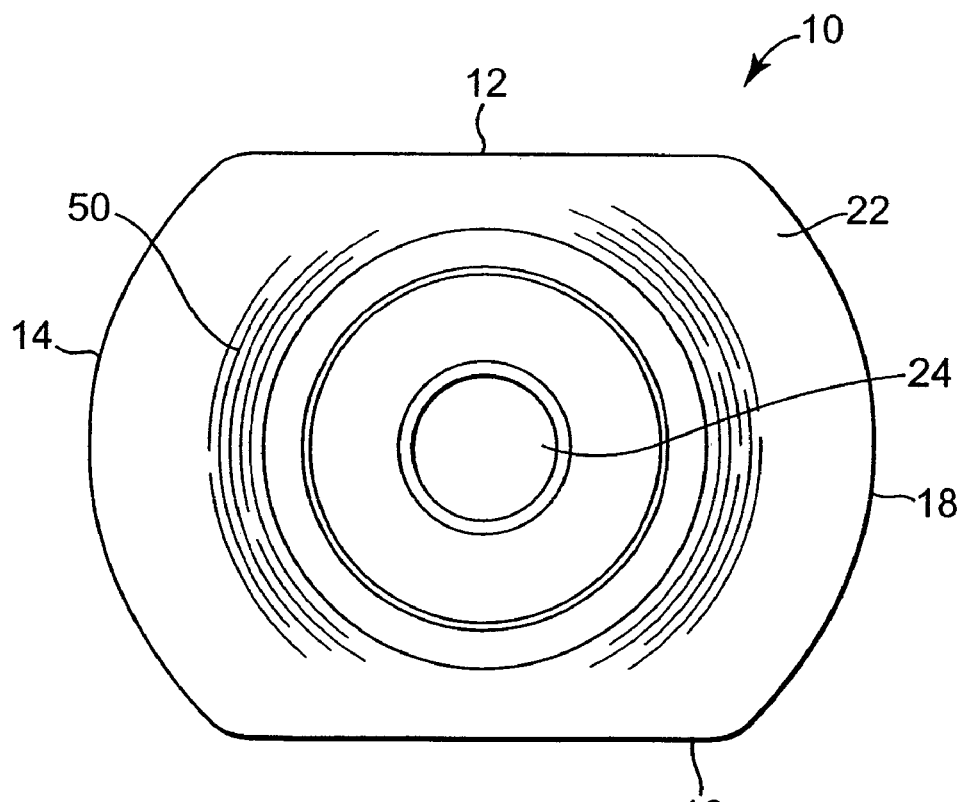
FIG. 2 is a rear view of the stored-value card of FIG. 1, according to the present invention.

Turning to the figures, FIGS. 1 and 2 illustrate a stored-value card 10 such as a gift card or other pre-paid card. In one embodiment, stored-value card 10 is generally planar and is defined by first, second, third, and fourth edges 12, 14, 16, and 18. First edge 12 and third edge 16 are each generally linear and are spaced from and positioned generally parallel to one another. Second edge 14 extends between first and third edges 12 and 16 with a convex curvature. Fourth edge 18 extends between first and third edges 12 and 16 opposite second edge 14. More specifically, fourth edge 18 extends with a convex curvature.

In one embodiment, stored-value card 10 is sized and shaped similar to a credit or debit card, but with curved edges 16 and 18 rather than the typically straight edges of credit or debit cards. Accordingly, stored-value card 10 is sized to fit within a wallet or other holder sized to receive a credit or debit card. In addition, curved edges 16 and 18 facilitate placement of stored-value card 10 in an electronic device, for example, an optical data reader (e.g. a CD-ROM drive, a DVD player, or a CD player) or any suitable electronic data reader.

A first generally planar surface 20 is defined between edges 12, 14, 16, and 18 and a second generally planar surface 22 is defined between edges 12, 14, 16, and 18 and is opposite first surface 20. An aperture 24 extends through and is generally centered on each of first surface 20 and second surface 22. Aperture 24 is sized to be received by an optical data reader. In one embodiment, aperture 24 is sized and shaped to engage the drive mechanism or rotatable spindle of the optical data reader.

In one embodiment, first surface 20 is formed of a substrate, such as polycarbonate, resin, plastic, or other suitable material that is durable and flexible. Use of the above-described substrates will generally prevent stored-value card 10 from cracking or breaking due to excessive pressure in a wallet or other holder and will otherwise generally protect against "wear and tear," while still maintaining sufficient rigidity to be read by the electronic device.

First surface 20 includes indicia including one or more of brand or store-identifying indicia 30, descriptive indicia 32, and decorative indicia 34. Brand or store identifying indicia 30 indicate the associated brand or store for which stored-value card 10 can be used and applied with a logo, slogan, brand indicia, trademark, or other identifying graphic and/or text. For instance, store identifying indicia 30 indicate the particular store that will accept stored-value card 10 as payment for goods and/or services.

Descriptive indicia 32 indicate what software stored-value card 10 includes. For example, as illustrated in FIG. 1, descriptive indicia 32 indicate that stored-value card 10 is a gift card and that stored-value card 10 includes computer games, in particular, holiday computer games. In other examples, descriptive indicia 32 include the number and types of games, activities, and/or static data stored on stored-value card 10 or any other indication of what data is stored on stored-value card 10, such as coupons, movie trailer(s), music, etc.

Decorative indicia 34 include any symbol, color, characters, graphics, or other objects that add to the overall look of stored-value card 10. In particular, decorative indicia 34 may include an attention-grabbing display 36 including text characters and/or objects, such as the "Wanna Play" line illustrated in FIG. 1. In one embodiment, the attention-grabbing display 36 includes an object 38, such as an animal, symbol, etc., relating to the product or store to which the stored-value card 10 is linked, such as a mascot or logo associated with the store or product. For example, the object 38 in FIG. 1 is a dog mascot of the store or product with which the stored-value card 10 is associated.

Alternatively or additionally, decorative indicia 34 may include seasonal or occasion-specific decorative indicia 40. More specifically, decorative indicia 34 are related to an occasion, such as a graduation, wedding, new baby, etc., a season, such as winter, spring, summer, or fall, and/or a holiday, such as Christmas, Hanukkah, Independence Day, Halloween, Thanksgiving, etc. In one example, stored-value card 10 is available to consumers during the winter holiday season. Accordingly, occasion-specific decorative indicia 40 include snowflakes and a generalized indication of a snow-covered ground as illustrated in FIG. 1.

In other embodiments, occasion-specific decorative indicia 40 may include one or more of objects such as Christmas trees, a nativity scene, menorah, fireworks, flower, leaf, graduation hat, stork, wedding ring, jack-o-lantern, ghost, etc. depending upon the occasion, season, or holiday at which the stored-value card 10 is targeted. Accordingly, indicia 34 are one example of means for associating stored-value cared 10 with at least one of a holiday, a season, and an occasion. In one embodiment, decorative indicia 40 are related to other information stored on stored-value card 10, such as software represented by the data stored on stored-value card 10, as will be further described below.

Stored-value cards according to embodiments of the invention, as well as the games or other interactive or static activities provided by the stored-value cards, are linked to seasonal or occasion-specific marketing activities of a retail store or other entity. For example, a winter-themed card, decorated with snowflakes and other winter-type indicia and providing winter-themed games or activities, is released, i.e. first offered for sale, at the beginning of a retailer's holiday sales season, and is removed from sale at the end of the season or shortly thereafter. Branding, decoration, other indicia on the card, and the games or activities themselves thus are chosen and designed to generate interest and "buzz" about a particular retailer, its products, and the exciting opportunities the retailer provides during a finite period of time such as the holiday shopping season or other season or event. As such, stored-value cards according to embodiments of the invention promote sales of the stored-value cards as well as of the associated goods and services available within a retail environment.

First surface 20 also includes an account identifier 48 such as a bar code, magnetic code, or other suitable identifier readily readable by a point-of-sale terminal or other account access station or kiosk. Account identifier 48 indicates a financial account or record to which stored-value card 10 is linked. An account or record of the monetary balance on stored-value card 10 optionally is maintained on a database, other electronic or manual record-keeping system, or, in the case of "smart" cards, for example, on a chip or other electronics or devices on stored-value card 10 itself. Accordingly, by scanning account identifier 48, a financial account or record linked to stored-value card 10 is identified and can subsequently be activated, have amounts debited therefrom, and/or have amounts added thereto. With the above in mind, account identifier 48 is one example of means for linking stored-value card 10 with a financial account or record.

Second surface 22 of stored-value card 10 stores data such as data representing software for subsequent access and reading by the electronic device. In one embodiment, second surface 22 includes a plurality of optical data tracks 50 concentrically positioned about aperture 24. Each data track 50 is configured to store the aforementioned data. In one embodiment, each optical data track 50 is formed in a layer of polycrystalline or other suitable material and can be written and rewritten to several times by a CD burner or other suitable optical data track burner/writer.

In one embodiment, optical data tracks 50 of stored-value card 10 include data related to an End-User License Agreement (EULA) and interactive activities that are accessible via a CD-ROM. For example, upon insertion of stored-value card 10 into an optical data reader and/or upon running the programs stored in optical data tracks 50, a user interface including the EULA is automatically displayed to a user via a monitor, screen, or other suitable display device electrically coupled to the optical data reader. In one embodiment, additional user interfaces are not shown to a user until the user accepts the terms of the EULA. Additional details regarding one specific embodiment of an EULA are shown in FIG. 13.

Figure 3:
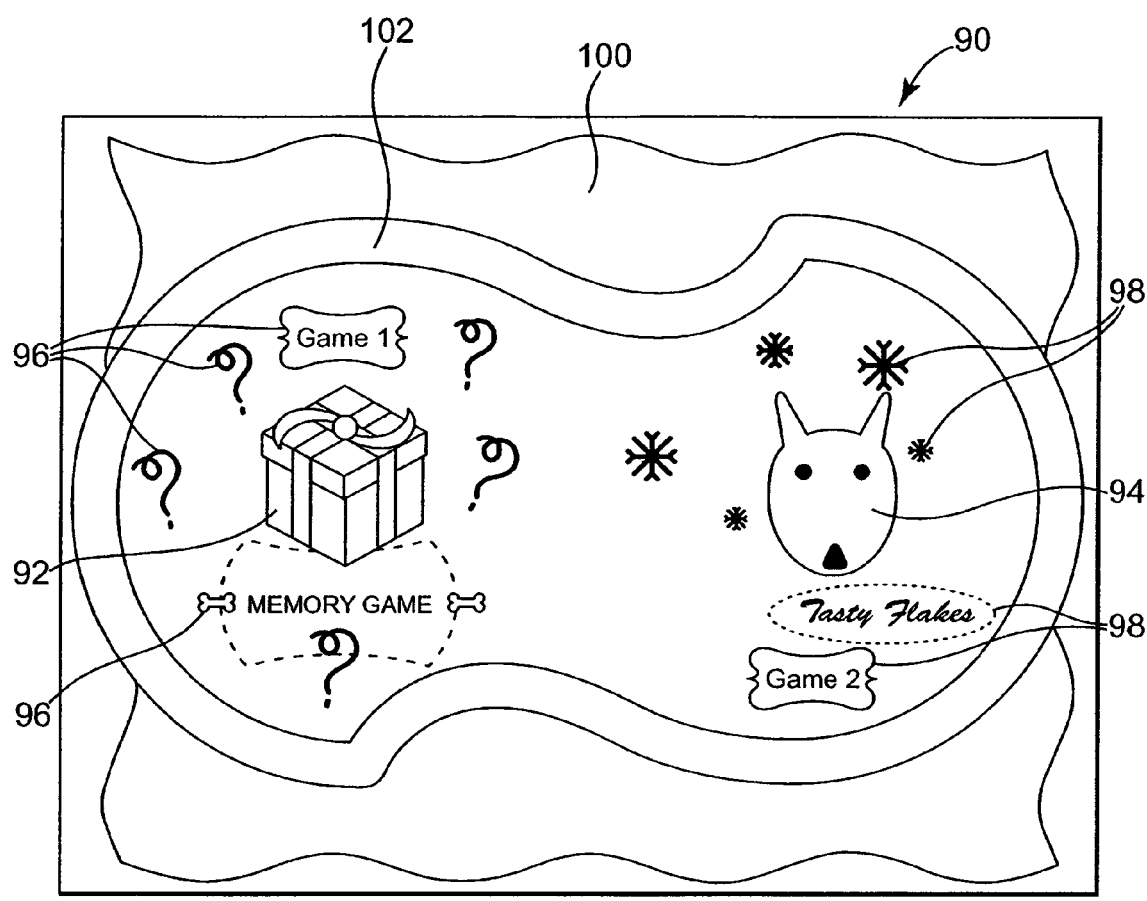
FIG. 3 is an illustration of one embodiment of a main menu user interface, according to the present invention.

As illustrated in FIG. 3, in one embodiment, a user interface 90 is presented to the user. User interface 90 is a menu, such as a main menu, generally including indicia of the software programs or activities represented by the data stored on stored-value card 10. In one embodiment, user interface 90 indicates that the software of stored-value card 10 includes a first game and a second game by illustrating a first game icon 92 and a second game icon 94. First game icon 92 may represent the first game by including a reference to either text, objects, and/or symbols included in the first game. In addition, additional indicia 96 related to the first game may also be presented near first icon 92, such as a reference to the game type or name and/or an additional graphic related to the first game.

Second game icon 94 may represent the second game by including a reference to either text, objects, and/or symbols included in the second game. For example, in one embodiment, the second game includes a dog or other animal catching snowflakes and, accordingly, second game icon 94 includes a picture of the dog and/or the snowflakes involved in the second game. In one embodiment, additional indicia 98 are included generally near second game icon 94 to further indicate aspects of the second game. In one embodiment, additional indicia 98 include a reference to the game name as well as an illustration of a character included in the second game.

In one embodiment, game icon 92 and/or 94 and/or additional indicia 96 and/or 98 include reference to a store, brand, or other product identifier and/or to a mascot, object, symbol, or other item that users generally associate with the card provider. In one example, one or more of game icons 92 and 94 and additional indicia 96 and 98 relate to an occasion, season, or holiday for which stored-value card 10 is offered. In one embodiment, main menu user interface 90 additionally includes one or more backgrounds 100 or borders 102 to further populate main menu user interface 90. In one embodiment, backgrounds 100 and borders 102 relate to a trademark, object, color, mascot, or symbol associated with the card provider. In one example, backgrounds 100 and borders 102 relate to an occasion, season, or holiday for which stored-value card 10 is offered. Thus, icons 92 and 94, additional indicia 96 and 98, backgrounds 100, and/or borders 102 provide one example of means for associating stored-value card 10 with at least one of a holiday, a season, and an occasion.

In addition to being aesthetically linked to the software data on financial transaction card 10 and/or to the provider or product associated with stored-value card 10, each icon 92 and 94 is also actively linked to the software data. In other words, by a user selection or click on one of icons 92 and 94, the user is presented with an aspect of the software, such as the interactive activity or data set represented by the respective icon 92 or 94. For example, in one embodiment in which first icon 92 is linked to a first game and second icon 94 is linked to a second game, user selection of one of icons 92 and 94 selects which of the first game and second game the user wishes to play or otherwise access.

Upon user selection of first icon 92, the user is presented with a new user interface unique to the associated first game. In one embodiment, the user is presented with a first game menu that includes items such as directions, level selection tools, etc. Upon reviewing and selecting to begin play at the first game menu, the user is presented with a first game user interface 110, such as that illustrated in FIG. 4. In one example, the first game is related to at least one of the occasion, season, holiday, store identifiers, brand identifiers, products, etc.

Figure 4:
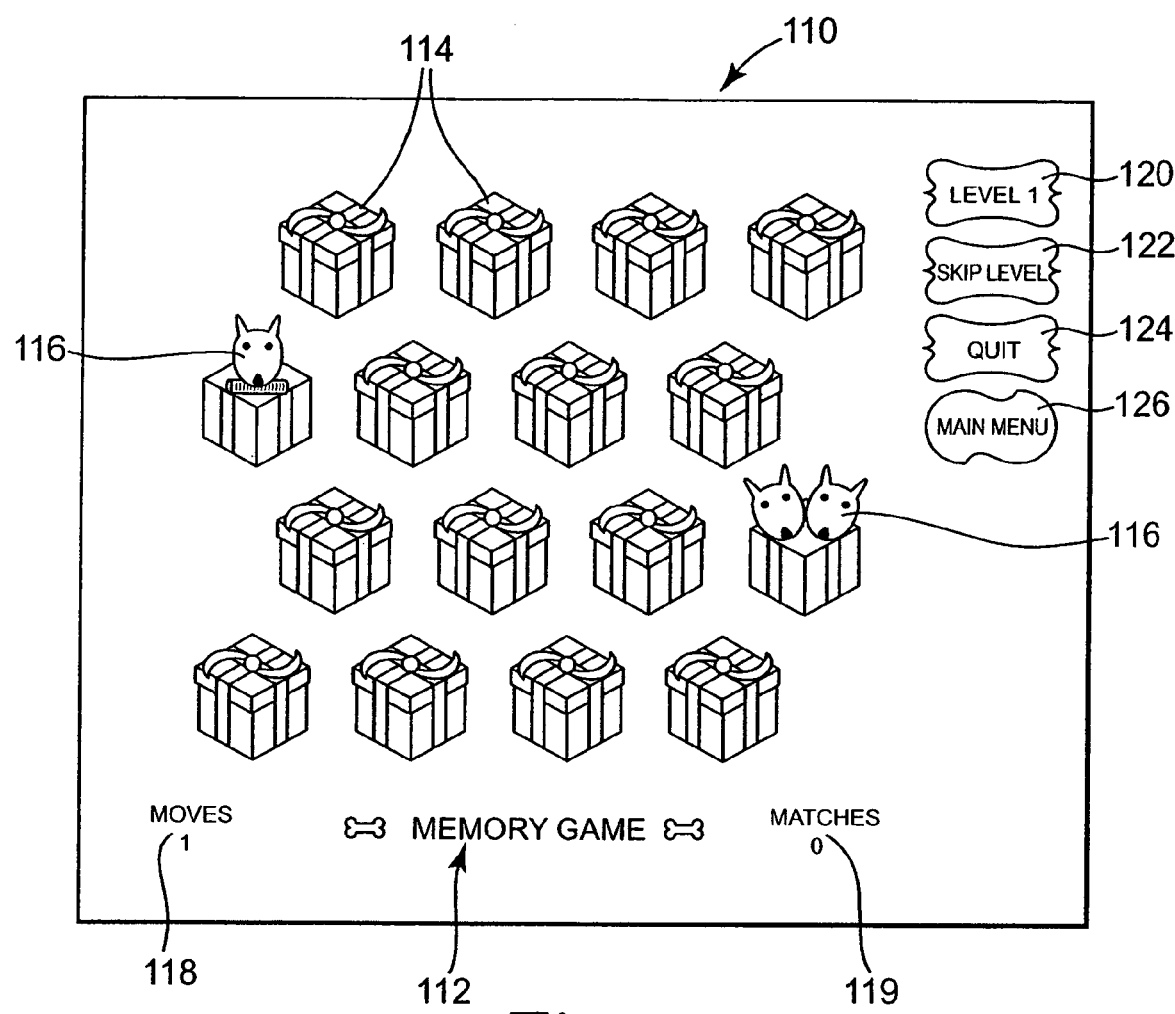
FIG. 4 is an illustration of one embodiment of a first game user interface, according to the present invention.

For example, first game user interface 110 illustrated in FIG. 4 presents a memory game related to gift giving and including reference to a dog mascot of the store or product associated with stored-value card 10. In particular, game user interface 110 represents a memory game as indicated generally by game title indicia 112 and includes a plurality of wrapped boxes 114. Each of the plurality of wrapped boxes 114 houses contents such as a particular view of a store mascot, a symbol, a product, an object relating to one or more of an occasion, season, or holiday, or a mixture of the different contents described above. The plurality of wrapped boxes 114 are divided into pairs of boxes where each box 114 in a pair houses similar or identical contents. Boxes 114 of different pairs have different contents 116.

Upon a user clicking or otherwise selecting one of the plurality of boxes 114, the selected box 114 is opened to reveal contents 116 of the selected box 114. In each turn, the user is able to select two boxes 114. The object is to select box pairs, i.e. to find two boxes 114 with matching contents 116, in a single turn. Therefore, for each turn or move, two boxes 114 are selected by the user and compared to determine if the selected boxes have matching contents 116. In one embodiment, once both boxes 114 of a pair are selected in a single turn, that pair of boxes is removed from game user interface 110. Accordingly, a user continues to takes turns until all the plurality of boxes 116 are paired and/or removed from game user interface 110.

In one embodiment, the number of moves, which is equal to the number of turns the user has taken, is tracked by a move counter 118. In one embodiment, the number of matches (i.e., the number of box pairs identified) is indicated by a match counter 119. In one embodiment, following completion of first level, a user is presented with a score and an opportunity to move on to the next level. In one example, the score is equal to the number of moves taken at the first level to match all the boxes 114. In one embodiment, subsequent levels sequentially increase in difficulty, for example, by presenting a user with a larger plurality of boxes 114 to match or pair.

In one embodiment, first game user interface 110 additionally includes one or more of level indicia 120, a skip level button 122, a quit button 124, and a main menu button 126. Level indicia 120 indicate the current level of the first game that the user is playing. Skip level button 122 allows a user to skip the current level by clicking on or otherwise selecting skip level button 122. Similarly, quit button 124 allows a user to quit the current game by clicking on or otherwise selecting quit button 124. Upon clicking on or otherwise selecting main menu 126 button, the user is exited from the first game and returned to main menu user interface 90.

Figure 5:
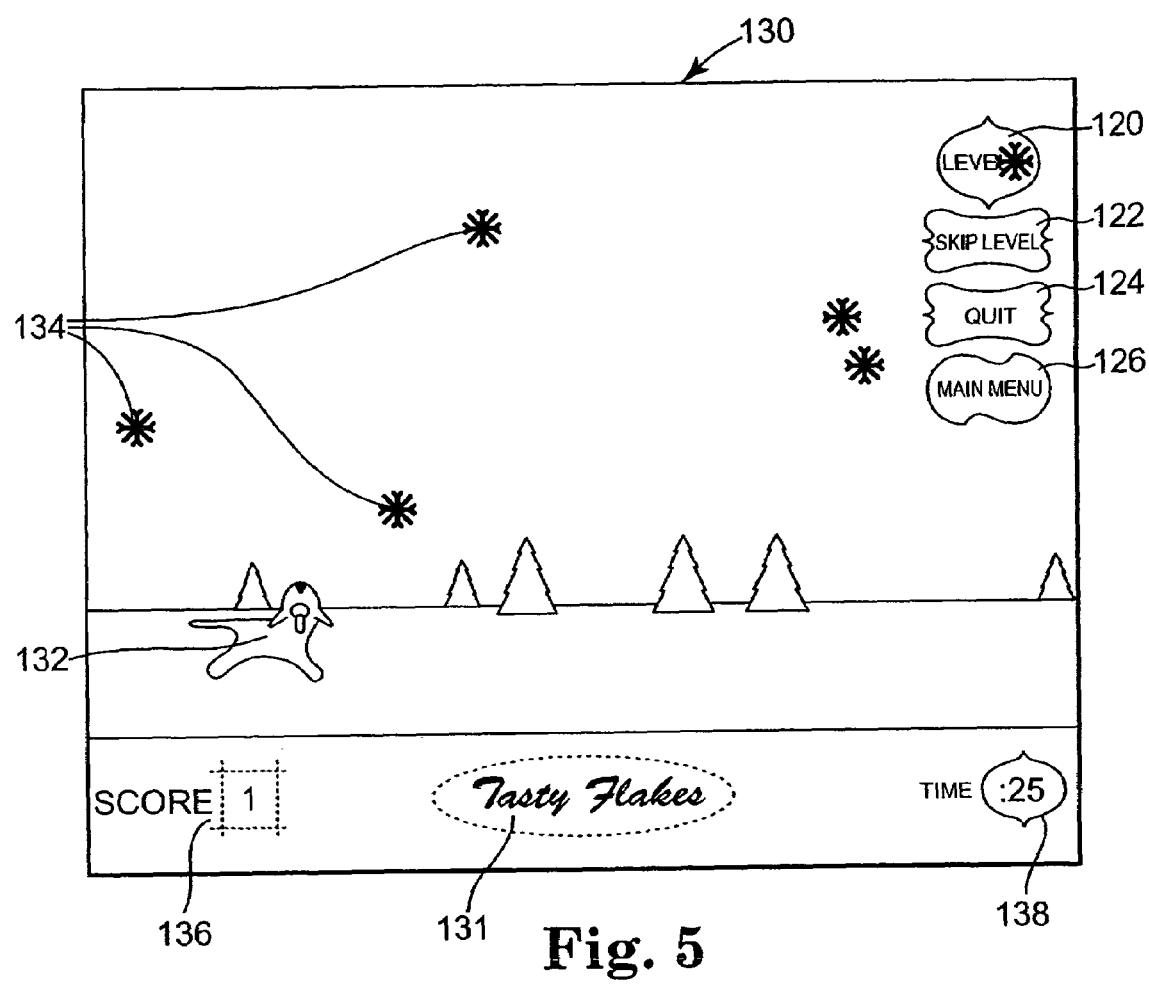
FIG. 5 is an illustration of one embodiment of a second game user interface, according to the present invention.

User selection of second icon 94 causes the user to be presented with a new user interface unique to the associated second game. In one embodiment, the user is presented with a second game menu that includes items such as directions, level selection tools, etc. for the second game. Upon reviewing and selecting to begin play on second game menu, the user is presented with a second game user interface 130, one example of which is illustrated in FIG. 5. In one example, the second game is related to at least one of the occasion, season, holiday, store identifiers, product, etc. The game type or title is included on second game user interface 130 as title indicia 131.

In second game user interface 130 of FIG. 5, the game is focused around the dog mascot 132 of the store or product associated with stored-value card 10, which is trying to catch falling snowflakes 134 on its tongue. In this respect, the game is related to the store or product via dog mascot 132 and is also related to the winter season with the inclusion of snowflakes 134. The user is able to control movements of dog mascot 132 including the direction of movement and jumping of the dog in an attempt to catch a greater number of snowflakes 134. Additional levels of the second game may incorporate additional obstacles, such as frozen ponds or flying snowballs, and/or may incorporate additional rewards such as bones or treats.

In one embodiment, second game user interface 130 additionally includes score indicia 136 and a time indicator 138. Score indicia 136 relay to the user a score the user has accumulated by catching snowflakes 134 and/or other rewards on the tongue of dog mascot 132. Time indicator 138 indicates how much time a user has left at the current level to attempt to catch more snowflakes 34. In one embodiment, time indicator 138 includes a ticker clock counting down the number of seconds until the current level is completed. In one embodiment, second game user interface 130 includes level indicia 120, skip level button 122, quit button 124, and main menu button 126 as described above with respect to first game user interface 110.

With the above in mind, stored-value card 10 functions as a financial transaction or gift card, but additionally provides recipient of stored-value card 10 with the additional gift of one or more software interactive activities, such as the games described above. In one embodiment, the software activities are provided to appeal to a wide variety of ages. In other embodiments, the software activities are targeted toward an average age group for a particular occasion, such as graduation. Accordingly, a consumer gifting the stored-value card 10 to a recipient is able to provide the recipient with more than just a stored-value card. Moreover, the interactive activities generally relate to the store or other brand identification, thereby providing additional marketing opportunities for the store or other product providers to reach the recipient of stored-value card 10. In addition, any seasonal or occasion-specific objects or indicia included in the interactive activities, such as boxes 114 and snowflakes 134, provide means for associating stored-value card with at least one of a holiday, a season, and an occasion.

In one embodiment, in addition or as an alternative to one or more of the games described above, at least one of the software activities provided by stored-value card 10 includes a dressing room, which allows a user to dress a body sized and shaped similar to his or herself in clothes available from the store associated with stored-value card 10. According to another embodiment, a software activity includes a personalization area where the giver can personalize stored-value card 10 to the recipient and/or occasion, season, or holiday with a message, pictures, digital photographs, music or other items. In one embodiment, the software of stored-value card 10 additionally or alternatively includes other read-only activities such as movie trailers, music samples, coupons, web site links, product information, advertisements, demonstrations, etc. With the above in mind, the data stored on stored-value card 10 is one example of means for providing interactive brand-related activities to a user.

Figure 6:
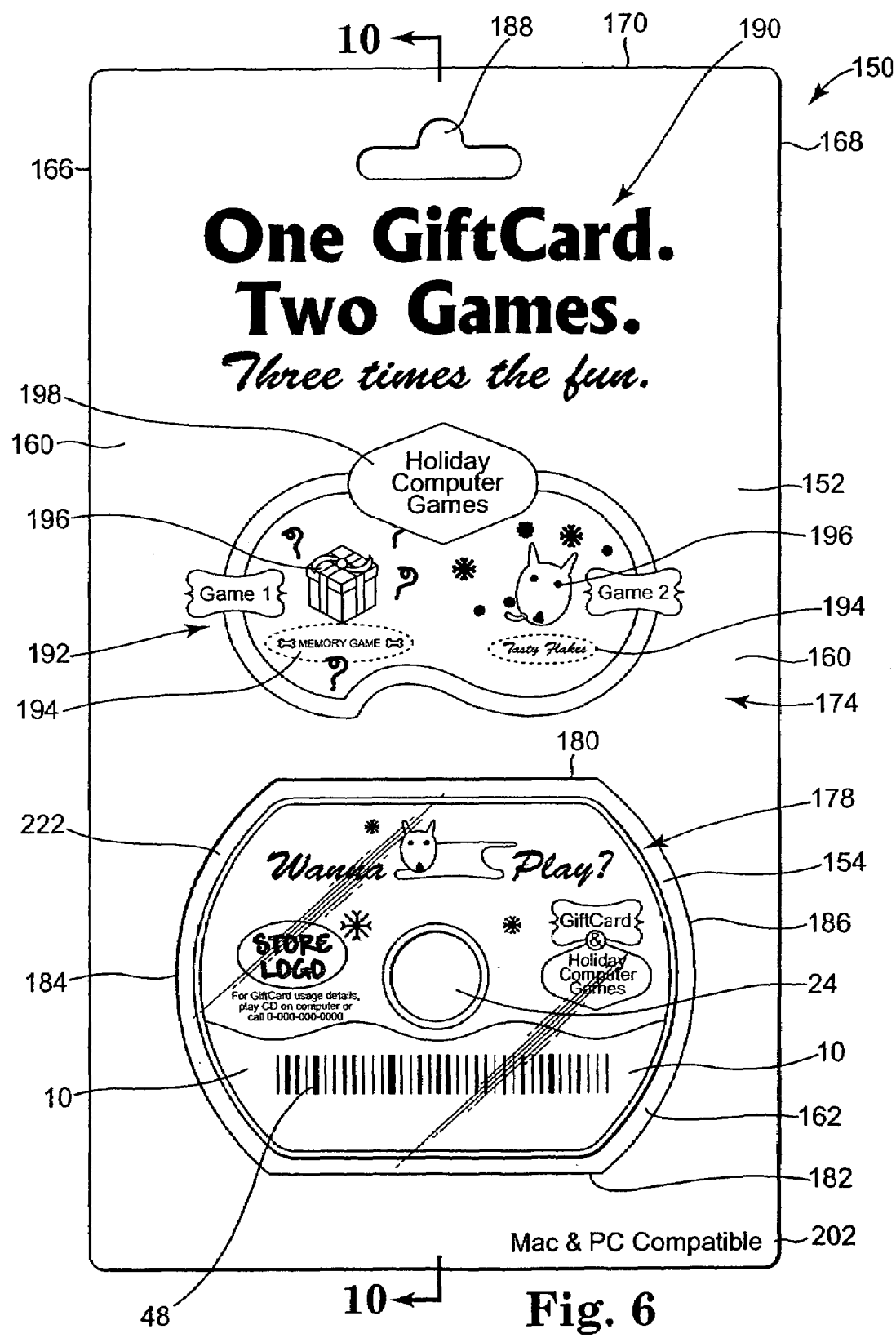
FIG. 6 is a front view of one embodiment of a packaged card product, according to the present invention.

In one embodiment, stored-value card 10 is placed within a package or carrier to facilitate marketing or general placement within a retail store or setting. FIG. 6 illustrates one embodiment of a packaged card product 150 including a bi-fold package backer 152, a window 154, and stored-value card 10. Packaged card product 150 is configured to provide stored-value card 10 between surfaces of bi-fold package backer 152 such that stored-value card 10 is visible to consumers and purchasers through transparent substrate or window 154. By placing stored-value card 10 to be viewable by consumers, consumers are fully informed of what the card they are purchasing looks like. In addition, the size of package backer 152 increases the overall size of packaged card product 150, increasing marketing area on packaged card product 150 and decreasing the ease of shoplifting packaged card product 150.

Figure 7A:
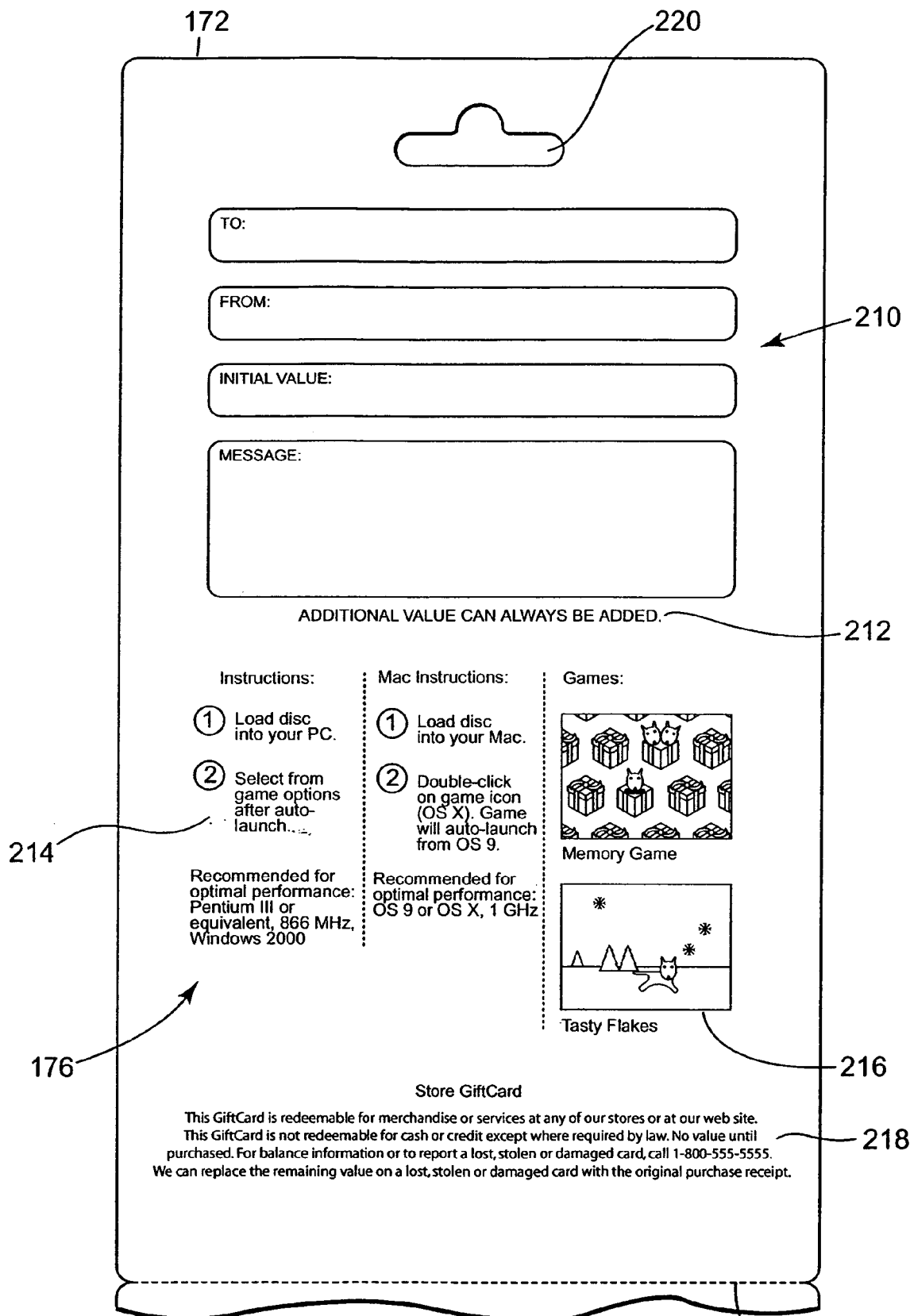
FIG. 7A is an enlarged front inverted view of a bottom panel of the outside of the package backer of FIG. 7.

FIGS. 7, 7A, and 8 illustrate one embodiment of package backer 152. Package backer 152 is an elongated, generally rectangular piece of a generally planar material, such as cardstock, paperboard, plastic, or other suitable material. More specifically, package backer 152 is a bi-fold substrate that is roughly foldable in half. In FIGS. 7 and 8, package backer 152 is unfolded, i.e. is in an open configuration. Accordingly, unfolded package backer 152 defines an outside, printed surface 160 and an inside surface 162 opposite printed surface 160. A perforated line 164 is laterally defined between opposite longitudinal edges 166 and 168 and is generally centered between opposite lateral edges 170 and 172 to define a top panel 174 and a bottom panel 176.

Top panel 174 defines an aperture 178 similarly shaped and sized slightly larger than stored-value card 10 (FIG. 6). In one embodiment, aperture 178 includes two parallel and laterally extending edges 180 and 182 and two convex edges 184 and 186. Laterally extending edge 182 is spaced from laterally extending edge 180. Convex edges 184 and 186 each extend between laterally extending edges 180 and 182 opposite one another. In one embodiment, aperture 178 is formed relatively near to perforated line 164. In one example, top panel 174 further defines a support arm aperture 188 near top lateral edge 170 configured to receive a display support arm or hook.

In one embodiment, top panel 174 includes general marketing indicia 190 and software indicia 192. General marketing indicia 190 include phrases, wording, objects, or symbols targeted to attract the eye of consumers and/or to explain the basis of the product to consumers. For example, as indicated in FIGS. 6 and 7, general marketing indicia 190 both attract consumer attention and explain the product by stating "One Gift Card. Two Games. Three times the fun."

Software indicia 192 include an indication of what software, such as interactive activities, static activities, etc., are included on stored-value card 10. For example, as illustrated in FIGS. 6 and 7, software indicia 192 include a title 194 and a graphic 196 for each game included on stored-value card 10. In one embodiment, the design of software indicia 192 is similar in appearance to main menu user interface 90 (FIG. 3). As illustrated, software indicia 192 further include an indication of a holiday, season, and/or occasion, if any, that the software is related to. In the illustrated example, the software is identified as relating to winter holidays due to the use of the phrase "Holiday Computer Games" 198 and the appearance of snowflakes 200. Other suitable indicia can also be included on top panel 174, such as compatibility indicia 202 indicating the operating systems the software of stored-value card 10 is compatible with, etc.

Referring to FIGS. 7 and 7A, outside, printed surface 160 of bottom panel 176 displays indicia, graphics, or text information including store logo(s), store names(s), slogans, advertising, instructions, directions, brand indicia, promotional information, and/or other information. Indicia 210, for example, include "To," "From," "Initial GiftCard Value," and "Message" fields. Indicia 212 promote that stored-value card 10 is reloadable (i.e., value can be added to the account linked to stored-value card 10) at any time. In one embodiment, instructional indicia 214 are included to depict the instructions for accessing the software of stored-value card 10 (FIG. 6). In one example, instructional indicia 214 include instructions for use of card software on either a Macintosh computer or Windows PC. Instructional indicia 214 can also include recommended systems for optimal performance of the card software.

Optional game indicia 216 on bottom panel 176 illustrate a portion of each interactive activity included in the card software to further educate the buyer and recipient of the software included with the purchase of stored-value card 10. In one embodiment, redemption indicia 218 are also included on bottom panel 176 indicating that stored-value card 10 is redeemable for the purchase of goods and/or services and that, upon use, a value of the purchased goods and/or services will be deducted from the financial account or record linked to stored-value card 10. In one embodiment, redemption indicia 218 include phrases such as "<Name of Store>GiftCard" and "This GiftCard is redeemable for merchandise or services at any of our stores or at our website," and/or provides help or phone line information in case of a lost, stolen, or damaged stored-value card, etc.

In one example, bottom panel 176 further defines a support arm aperture 220 near bottom lateral edge 172 configured to receive a display support arm or hook. More particularly, support arm aperture 220 is positioned relative to bottom lateral edge 172 similar to the position of support arm aperture 188 of top panel 174 relative to top lateral edge 170.

Any of indicia 30, 32, 34, 40, 48, 190, 192, 202, 210, 212, 214, 216, 218, or other indicia, optionally may appear anywhere on outside, printed surface 160 of package backer 152 or stored-value card 10. Additional information besides that specifically described and illustrated herein also may be included. In this manner, printed surface 160 has an overall appearance corresponding in color, design, etc. with an overall appearance of stored-value card 10. Thus, indicia 30, 32, 34, 40, 48, 190, 192, 202, 210, 214, 216, 218, and other indicia correlating the overall appearance of printed surface 160 to the overall appearance of stored-value card 10 are examples of means for visually linking stored-value card 10 to package backer 152.

Referring to FIG. 8, in one embodiment, inside surface 162 of package backer 152 is generally blank other than a background field 222. In one embodiment, background field 222 is shaped similar to and sized slightly larger than window aperture 178. In other embodiments, background field 222 is shaped in another manner but is still larger than window aperture 178. In one embodiment, background field 222 is of a color or pattern complementing or matching the overall color or theme of printed surface 160.

Figure 9:
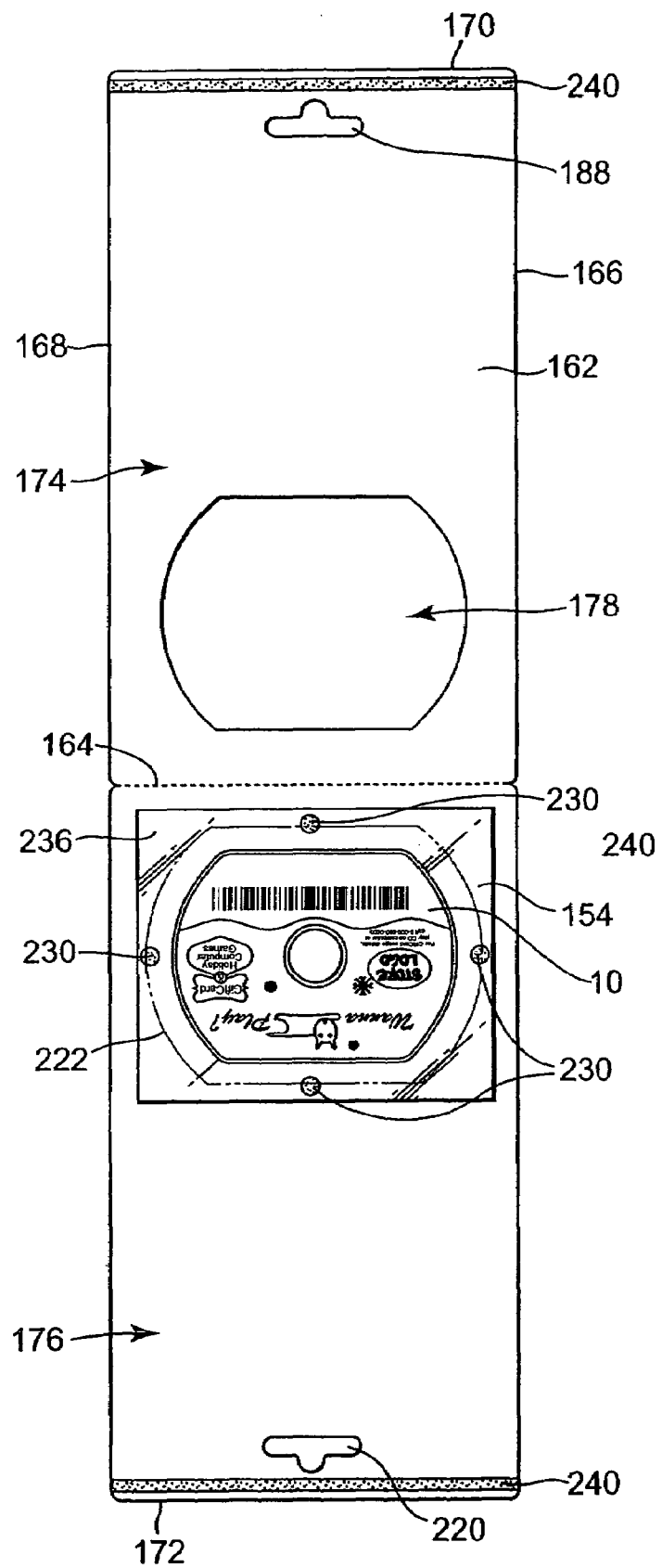
FIG. 9 is a back view of the package backer of FIG. 7 with a stored-value card and a transparent substrate during assembly, according to an embodiment of the present invention.
Figure 10:
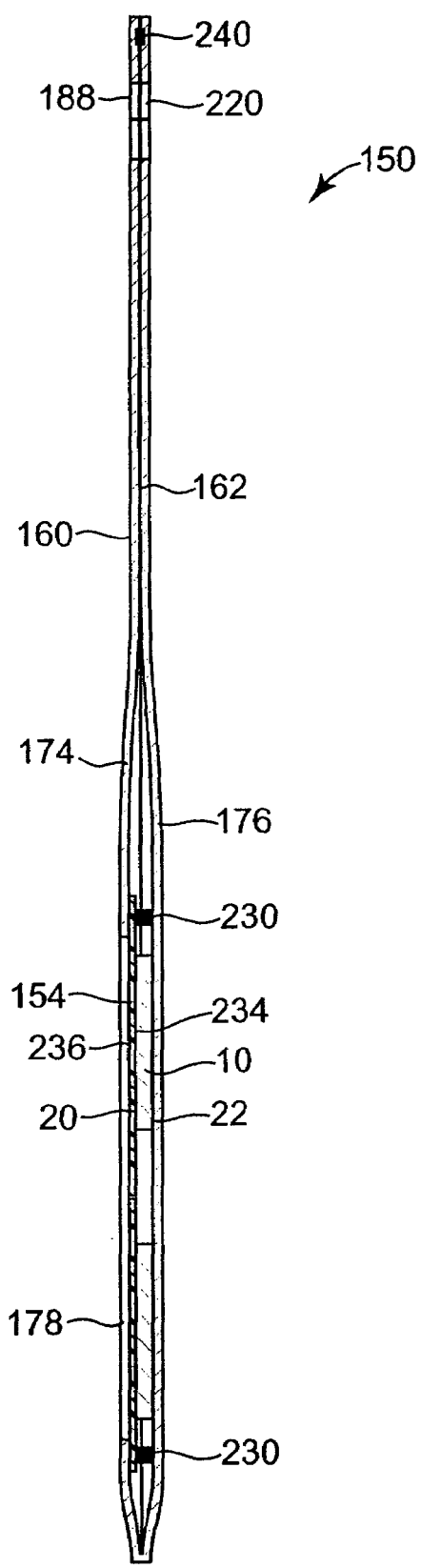
FIG. 10 is a cross-sectional view taken along line 10-10 of FIG. 6.

As illustrated with reference to FIGS. 9 and 10, upon assembly of packaged card product 150, second surface 22 of stored-value card 10 is placed upon bottom panel 176 of inside surface 162. More specifically, store-valued card 10 is generally centered upon background field 22 of package backer 152. Dots 230 of adhesive are placed about and spaced slightly from stored-valued card 10. In one embodiment, adhesive dots 230 are placed just outside a perimeter of window aperture 178. In other embodiments, curved or linear lines or other arrangement of adhesive may be applied to package backer 152 spaced from and about stored-value card 10.

Window or layer of generally transparent substrate 154 is placed over stored-value card 10. In particular, window 154 is generally planar and defines a first surface 234 and a second surface 236 opposite first surface 234. With this in mind, window 154 is placed over stored-value card 10 such that first surface 234 interacts with each adhesive dot 230 to secure window 154 to package backer 152 and, thereby to secure stored-value card 10 between window 154 and package backer 152. In one embodiment, window 154 is a generally clear vellum or other suitable material.

One or more lines of adhesive 240 are placed near top lateral edge 170 and near bottom lateral edge 172 of package backer 152. In one embodiment, additional adhesive is applied to inside surface 162 between top lateral edge 170 and window aperture 178 and between bottom lateral edge 172 and background field 222. Package backer 152 is folded generally in half about perforated line 164, and top panel 174 is pressed to back panel 176, adhering inside surface 162 of top panel 174 to inside surface 162 of bottom panel 176, as illustrated in e.g. FIGS. 6 and 10.

Once folded, window aperture 178 aligns with and fits over background field 222 and stored-value card 10. Due to window aperture 178 and window 154, stored-value card 10 is viewable from outside packaged card product 150. In one example, a portion of background field 222 is viewable through window aperture 178 about stored-value card 10 and/or through aperture 178. Accordingly, package backer 152 and window 154 are one example of means for removably supporting stored-value card 10 for display in a retail setting.

With the above in mind, account identifier 48 of stored-value card 10 is also viewable through window 154 of packaged card product 150. In one embodiment, a scanner or other reader can access account identifier 48 to activate stored-value card 10 through window 154. Stored-value card 10 is activated when a monetary amount is added to the financial account or record linked to stored-value card 10. In one embodiment, upon the initial reading of account identifier 48 by a point-of-sale terminal or other terminal, a preset or customized monetary value is automatically added to the financial account or record linked to stored-value card 10. Thus, scanning account identifier 48 through window 154 illustrates one example of means for activating or loading value on stored-value card 10 through package backer 152 and window 154.

Figure 11:
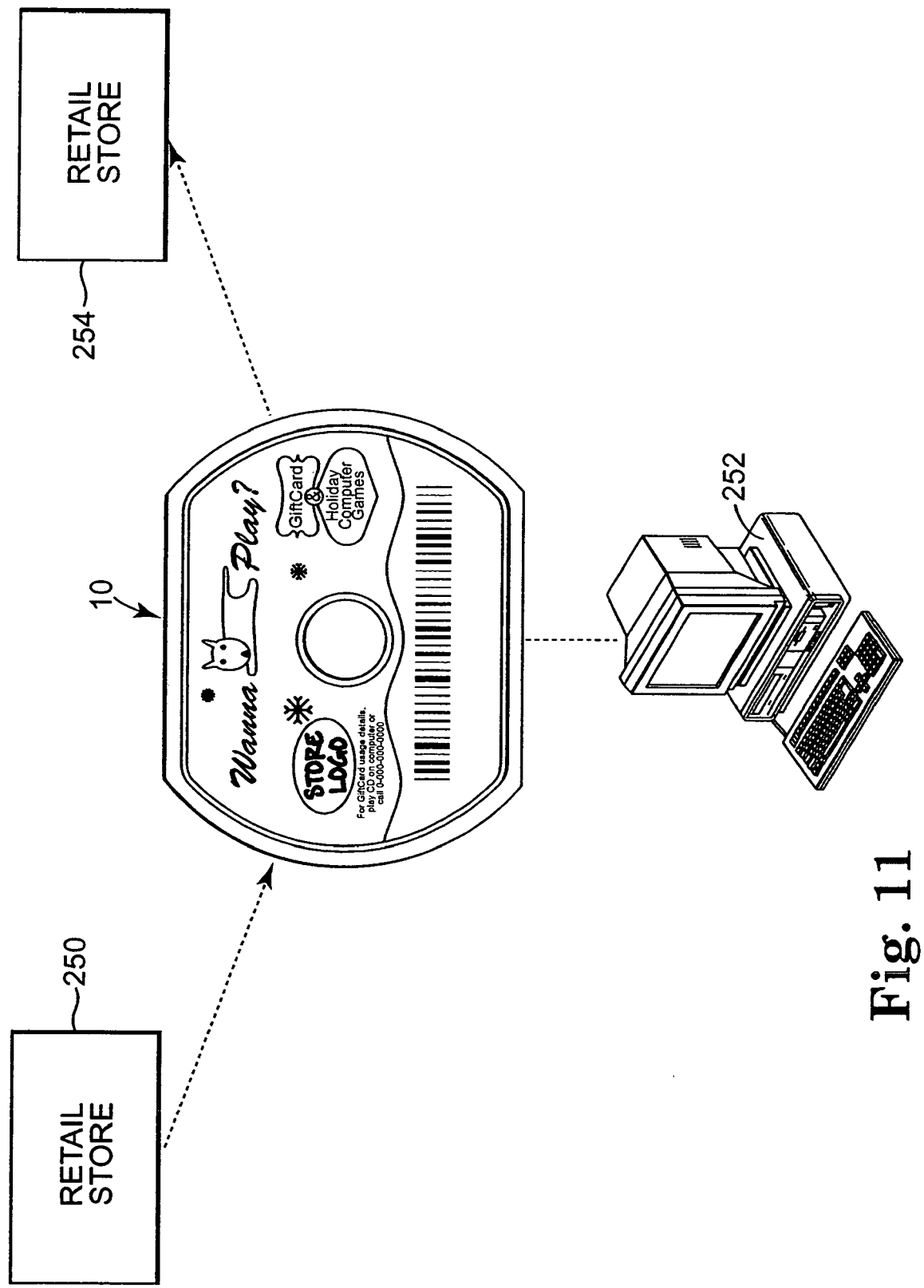
FIG. 11 is a schematic illustration indicating use options of a stored-value card, according to an embodiment of the present invention.

Referring to FIG. 11, stored-value card 10 is purchased and activated in a first retail store or setting 250. Once purchased, stored-value card 10 can be placed within an electronic device such as an optical data reader of a computer processing unit 252, which is remotely positioned with respect to retail store 250. The electronic device reads data from stored-value card 10 and presents the software including the interactive activities and/or static data to the user. Prior to or subsequent to accessing the software of stored-value card 10, stored-value card 10 is transportable back to first retail store or setting 250 or to a second remote retail store or setting 254 to redeem stored-value card 10, more particularly to redeem the monetary value in the financial account or record associated with stored-value card 10, for goods and/or services. In one embodiment, one or both of retail settings 250 and 254 is a store or web site. Stored-value card 10 thus provides (1) a pre-paid card for purchasing goods and/or services at one or more retail settings and (2) a software package configured to entertain and/or educate the user. In one embodiment, providing a software package also serves to expose the user to additional marketing messages from the retail setting or related to a product line or brand.

Figure 12:
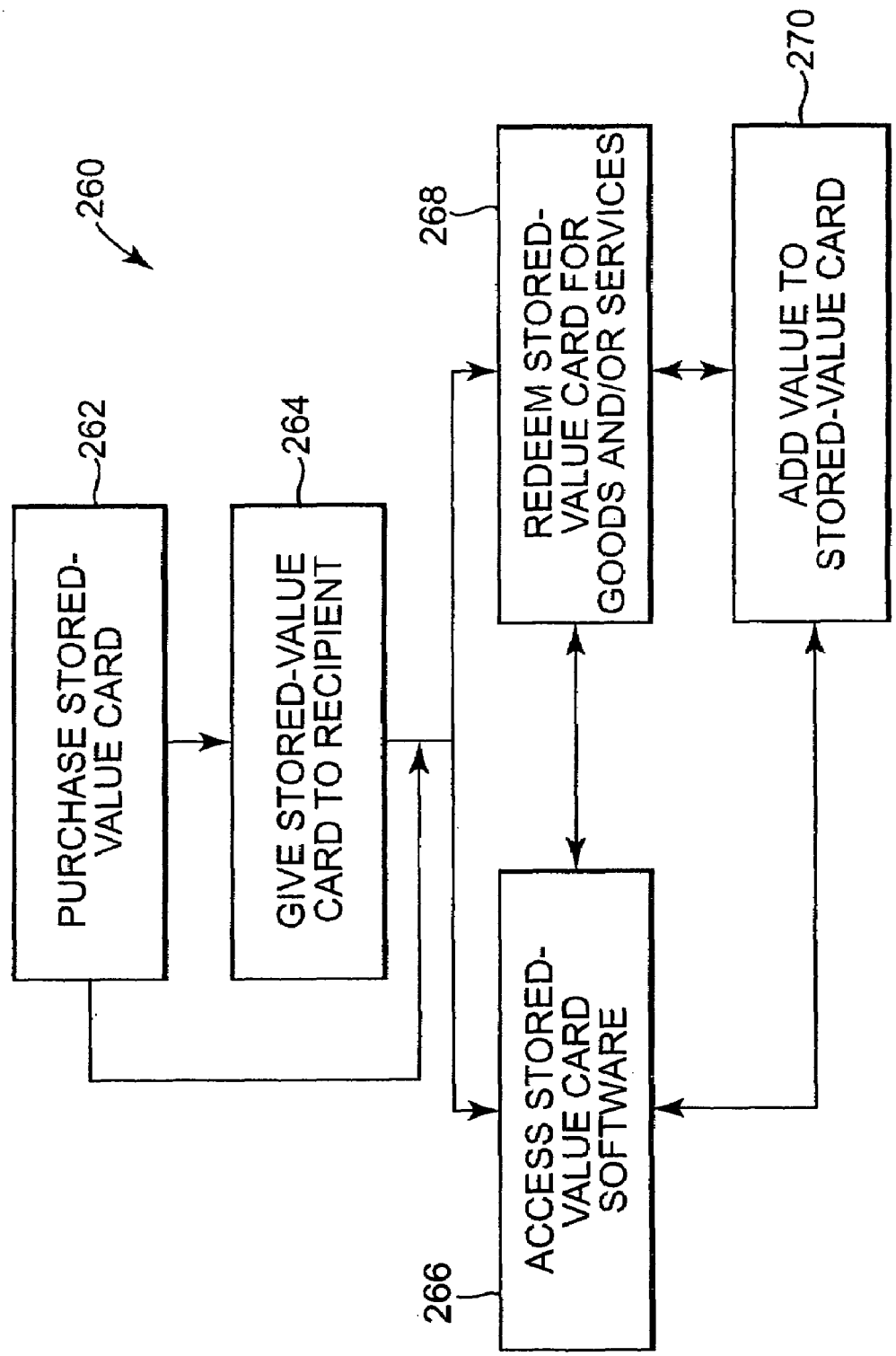
FIG. 12 is a flow chart generally illustrating one embodiment of a method of using a stored-value card, according to the present invention.

FIG. 12 is a flow chart illustrating one embodiment of a method 260 of using stored-value card 10. At 262, stored-value card 10 is purchased by an original consumer from a retail store, such as retail store 250. At 264, the consumer optionally gives stored-value card 10 to a recipient, such as a graduate, a relative, a friend, expectant parents, one having a recent or impending birthday, a couple having a recent or impending anniversary, etc. As an alternative, the original consumer can keep stored-value card 10 for his or her own use.

At 266, the original consumer or the recipient, whomever is in current ownership of stored-value card 10, accesses the card software as described above. At 268, the current owner of stored-value card 10 redeems stored-value card 10 for goods and/or services from retail setting 250 or 254. At 270, the current owner of stored-value card 10 adds value to stored-value card 10, more particularly, to the account or record associated with stored-value card 10, at either retail setting 250 or 254. Upon accessing software at 266, redeeming stored-value card 10 at 268, or adding value to stored-value card 10 at 270, the current owner of stored-value card 10 subsequently can perform any of steps 266, 268, or 270 as desired. In one embodiment, the ability of the current owner to repeat redeeming stored-value card 10 at 268 is limited by whether the account or record associated with stored-value card 10 has any value at the time of redemption.

FIG. 13 illustrates one embodiment of a user interface 300 including a EULA 362. User interface 300 displays EULA 362, a first button 364, and a second button 366. EULA 362 includes the terms for a legal agreement between the user of the software and/or other data on stored-value card 10 and the provider of the software product, such as a store, a product retailer, etc.

In one embodiment, EULA 362 includes one or more of an introductory section 368, a copyright section 370, a grant of license section 372, a limitations section 374, a termination section 376, a warranty disclaimer 378, a limitation of liability section 380, and a concluding section 382. Introductory section 368 includes an identification of the agreement and a description of the method of accepting the terms of the agreement. In one example, introductory section 368 includes a description of the method of accepting the terms of the agreement indicating that clicking first button 364, which is an "I ACCEPT" button, indicates user agreement to the license as described by EULA 362. In this embodiment, second button 366 is an "I DECLINE" button that is to be selected if a user does not wish to agree to or enter into the license described in EULA 362.

Copyright section 370 identifies that the laws of copyright applying to the software of stored-value card 10 and that all copyrights are owned by the card provider, be it a store or other provider. Grant of license 372 indicates that provisions of the data and software of stored-value card to the user is by license rather than by sale, limits the user to the number of copies, if any, allowed under EULA 362, and generally prohibits user rental of the software data. Limitations section 374 provides limitations on the user's use of the software data. For example, in one embodiment, limitations section 374 prohibits disassembly of the software data into subparts or components to be installed or utilized on multiple computers.

Termination section 376 lays out the ability of the provider (i.e., store, product provider, etc.) to terminate the license to the user if the user fails to comply with the terms laid out in EULA 362. In one embodiment, warranty disclaimer 378 disclaims both express and implied warranties to the extent permitted by law. Limitation of liability section 380 describes the damages for which the provider will not be liable arising out of the user misuse of or inability to use the software stored on stored-value card 10. In one embodiment, the limitation of liability section 380 additionally limits the total liability.

In one embodiment, concluding section 378 states that EULA 362 constitutes the entire agreement, thereby, disallowing the incorporation of other references into the license; that if any provision is unenforceable, that provision alone should be modified only by the extent necessary to bring it within the law while upholding other provisions of the agreement; a clarification of the scope of waiver of any individual breech of the agreement; a description of available remedies; an election of applicable law and jurisdiction; and/or a designation of contact should the user have any questions regarding EULA 362.

If the user selects second button 366, the user declines to enter into EULA 362 and the user will be blocked from accessing any additional software and/or data stored on stored-value card 10. If the user selects first button 364, the user accepts and enters into EULA 362 with the provider and is allowed to access the other software and/or data stored on stored-value card 10.

Stored-value cards come in many forms, according to embodiments of the invention. The stored-value card, like other gift cards, can be "recharged" or "reloaded" at the direction of the original consumer, the gift recipient, or a third party. The term "loading on" or "loaded on" a card herein should be interpreted to include adding to the balance of a financial account or record associated with the stored-value card. The balance associated with the stored-value card declines as the stored-value card is used, encouraging repeat visits. The card remains in the user's purse, wallet, or near a user's computer, serving as an advertisement or reminder to re-visit the associated merchant at a retail store or website. Stored-value cards according to embodiments of the invention provide a number of advantages to both the consumer and the merchant or retail store. Other stored-value cards in the realm of the present invention include loyalty cards, merchandise return cards, electronic gift certificates, employee cards, frequency cards, pre-paid cards, and other types of cards associated with or representing purchasing power or monetary value, for example.

Although the invention has been described with respect to particular embodiments, such embodiments are for illustrative purposes only and should not be considered to limit the invention. Various alternatives and changes will be apparent to those of ordinary skill in the art. For example, stored-value cards optionally are virtual or electronic cards accessible on a retailer's website, other Internet location, kiosk, or elsewhere for electronic transfers. Other modifications within the scope of the invention in its various embodiments will be apparent to those of ordinary skill.

What is claimed is:

1. A stored-value card, comprising:
    a first surface storing two interactive software programs each related to at least one of a brand, a store identifier, and a store mascot relating to a retail setting configured to redeem the stored-value card the interactive software programs adapted to be read by an optical data reader of an electronic device to perform at least one interactive activity, wherein the interactive software programs are programmed to prompt a display device of the electronic device to display a depiction of at least one of the brand, the store identifier, and the store mascot relating to the retail setting configured to redeem the stored-value card;
    a second surface opposite the first surface, the second surface including:
        account indicia signifying a financial account linked to the stored-value card, wherein the financial account is stored in a database separate from the stored-value card; and brand indicia including at least one of the brand, the store identifier and the store mascot relating to the retail setting configured to redeem the stored-value card.

2. The stored-value card of claim 1, wherein at least one of the interactive software programs comprises a game.

3. The stored-value card of claim 2, wherein the game includes a memory game.

4. The stored-value card of claim 1, wherein at least one of the interactive software programs includes a read-only program.

5. The stored-value card of claim 4, wherein the read-only program includes at least one of a movie trailer and a music sample.

6. The stored-value card of claim 4, wherein the read-only program includes at least one of coupons, web site links, product information, advertisements, and demonstrations.

7. The stored-value card of claim 2, wherein at least one of the interactive software programs is a read-only game.

8. The stored-value card of claim 1, wherein at least one of the interactive software programs is a dressing room program that allows a user to dress a body sized and shaped similar to his or herself in clothes available from the retail setting configured to redeem the stored-value card.

9. The stored-value card of claim 1, wherein the account indicia comprises a bar code.

10. The stored-value card of claim 1, wherein the second surface includes indicia related to at least one of a holiday, a season, and an occasion.

11. The stored-value card of claim 1, wherein the second surface includes indicia generally identifying at least one of the interactive software programs.

12. The stored-value card of claim 1, wherein at least one of the software programs is adapted to present an End-User License Agreement (EULA) to a user upon placement of the stored-value card into the electronic device, wherein the at least one software program is adapted to generally prevent a user from accessing the at least one interactive activity prior to the user accepting the terms of the EULA.

13. The stored-value card of claim 1, wherein the electronic device is part of a computer processing unit, which is separate from the stored-value card.

14. A method of using a card linked to a financial account or record, the method comprising:
identifying the financial account with an account identifier included on the card, wherein the financial account is stored in a database separate from the card,
activating the card by accessing the financial account that has been identified, wherein activating the card includes scanning the account identifier on the card through a generally transparent window in a package that houses the card;
interacting with read-only software that is optically stored on the card, wherein the software is related to at least one of a holiday, a season, and an occasion, wherein indicia on the package identifies the software;
using the card in payment of goods or services, the value of the goods or services being deducted from the financial account or record, wherein using the card includes accessing the financial account using the account identifier; wherein the software that is stored on the card comprises two interactive software programs each relating to at least one of a brand, a store identifier, and a store mascot relating to a retail setting configured to redeem the card.

15. The method of claim 14, wherein the two interactive software programs includes at least one interactive game, and interacting with the software includes playing the at least one interactive game.

16. The method of claim 14, wherein interacting with software includes interacting with the software via a computer processing unit that is separate from the card.

17. The method of claim 14, further comprising:
adding additional value to the card including scanning the account identifier.

18. The method of claim 14, wherein interacting with software includes exposing a user to marketing messages related to a store configured to accept the card for payment of goods and services.

19. A method of providing a stored-value card, the method comprising:
displaying a stored-value card supported by a backer, the stored-value card including;
a first surface optically storing two read-only, interactive software programs, and
a second surface opposite the first surface and including an account identifier configured to identify a financial account or record stored in a database separate from the stored-value card,
wherein the interactive software programs each relate to at least one of a brand, a store identifier, and a store mascot relating to a retail setting adapted to activate, load value on, or withdraw funds from the financial account or record, and
wherein displaying the stored-value card includes visually linking each of the stored-value card and the backer to the retail setting adapted to activate, load value on, or withdraw funds from the financial account or record;
scanning the account identifier through a portion of the backer to identify the financial account or record; and
accessing the financial account or record to one of activate, load value on, or withdraw funds from the financial account or record.

20. The stored-value card of claim 1, wherein the first surface includes concentric optical memory tracks storing the interactive software programs.

21. The stored-value card of claim 1, in combination with a bi-fold package including a window, wherein the stored-value card is placed within the bi-fold package such that the bar code is viewable through the window.

22. The stored-value card of claim 1, wherein the stored-value card is adapted for placement within at least one of a CD-ROM drive, a CD player, and a DVD player.

23. The stored-value card of claim 1, wherein the stored-value card defines a first edge, a second edge opposite the first edge, a third edge extending between the first edge and the second edge, and a fourth edge opposite the third edge and extending between the first edge and the second edge, wherein the first edge and the second edge are each generally linear, and the third edge and the fourth edge are each generally convex.

24. The stored-value card of claim 1, wherein the store identifier indicates the retail that is adapted to accept the stored-value card as payment for goods or services.

25. The stored-value card of claim 1, wherein the brand indicia is included on the second surface of the stored-value card.

26. The method of claim 19, wherein the interactive software programs include at least one of an interactive game, an interactive dressing room program, a movie trailer, and a music sample.

27. The method of claim 19, wherein the interactive software programs include at least one of coupons, web site links, product information, advertisements, and demonstrations.

28. The method of claim 19, wherein upon placement of the stored-value card into an electronic device configured to read the interactive software programs from the stored-value card, at least one of the interactive software programs is adapted to prevent a user from accessing the interactive software programs prior to user acceptance of an End-User License Agreement (EULA).

29. The method of claim 19, wherein the backer is a bifold backer including a window, and the stored-value card is placed within the bifold backer such that the account identifier is viewable through the window.

30. The method of claim 19, wherein the first surface of the stored-value card includes concentric optical memory tracks storing the interactive software programs.

31. The method of claim 19, wherein the stored-value card defines a first edge, a second edge opposite the first edge, a third edge extending between the first edge and the second edge, and a fourth edge opposite the third edge and extending between the first edge and the second edge, wherein the first and second edges are generally linear, and the third and fourth edges are generally convex.

32. The method of claim 19, wherein accessing the financial account or record to one of activate, load value on, or withdraw funds from the financial account or record includes accepting films withdrawn from the financial account or record as payment toward the purchase of at least one of goods and services from the retail setting.

* * * * *